(12) United States Patent
Zhang et al.

(10) Patent No.: US 9,515,923 B2
(45) Date of Patent: Dec. 6, 2016

(54) METHOD AND DEVICE FOR PROCESSING INTERCONNECTED RING IN MULTI-PROTOCOL LABEL SWITCHING

(71) Applicant: Huawei Technologies Co., Ltd., Shenzhen (CN)

(72) Inventors: Wenyang Zhang, Shenzhen (CN); Hengguang Cai, Shenzhen (CN); Jian Ye, Shenzhen (CN); Yang Yang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 110 days.

(21) Appl. No.: 14/305,619

(22) Filed: Jun. 16, 2014

(65) Prior Publication Data

US 2014/0313893 A1    Oct. 23, 2014

Related U.S. Application Data

(63) Continuation of application No. PCT/CN2012/082604, filed on Oct. 9, 2012.

(30) Foreign Application Priority Data

Dec. 16, 2011 (CN) .......................... 2011 1 0424163

(51) Int. Cl.
*H04L 12/723* (2013.01)
*H04L 12/42* (2006.01)
(Continued)

(52) U.S. Cl.
CPC ............... *H04L 45/50* (2013.01); *H04L 12/42* (2013.01); *H04L 45/28* (2013.01); *H04L 47/12* (2013.01); *H04L 2012/421* (2013.01)

(58) Field of Classification Search
None
See application file for complete search history.

(56) References Cited

U.S. PATENT DOCUMENTS

| | | | |
|---|---|---|---|
| 6,728,484 B1 * | 4/2004 | Ghani | H04J 14/0227 385/50 |
| 7,099,327 B1 * | 8/2006 | Nagarajan | H04Q 11/0478 370/394 |

(Continued)

FOREIGN PATENT DOCUMENTS

| | | |
|---|---|---|
| CN | 1697416 A | 11/2005 |
| CN | 101594191 A | 12/2009 |

(Continued)

OTHER PUBLICATIONS

Kompella, K. et al., "Detecting Multi-Protocol Label Switched (MPLs) Data Plane Failures," Network Working Group, Feb. 2006, 50 pages.

(Continued)

*Primary Examiner* — Hassan Kizou
*Assistant Examiner* — Deepa Belur
(74) *Attorney, Agent, or Firm* — Slater Matsil, LLP

(57) ABSTRACT

Embodiments of the present invention disclose a method and a device for processing an interconnected ring in multi-protocol label switching. The method includes classifying to-be-processed services as a single ring service for an original ring and a cross-ring service for an interconnected ring corresponding to the original ring, determining information about a virtual point corresponding to the interconnected ring, creating a virtual channel of the original ring according to the information about the virtual point, using the virtual channel to forward the cross-ring service to the interconnected ring, and processing the single ring service according to a pre-created actual channel of the original ring.

22 Claims, 7 Drawing Sheets

(51) Int. Cl.
*H04L 12/801* (2013.01)
*H04L 12/703* (2013.01)

(56) References Cited

U.S. PATENT DOCUMENTS

| | | | | |
|---|---|---|---|---|
| 7,545,735 | B1* | 6/2009 | Shabtay | H04L 1/22 370/217 |
| 8,711,838 | B1* | 4/2014 | Guichard | H04L 12/4633 370/351 |
| 2004/0170184 | A1* | 9/2004 | Hashimoto | H04L 12/42 370/401 |
| 2005/0249233 | A1* | 11/2005 | Akaba | H04L 12/42 370/432 |
| 2005/0265365 | A1 | 12/2005 | Wan | |
| 2007/0206618 | A1* | 9/2007 | Zelig | H04L 12/4637 370/404 |
| 2007/0280251 | A1* | 12/2007 | Wang | H04L 12/437 370/395.1 |
| 2009/0073988 | A1 | 3/2009 | Ghodrat et al. | |
| 2010/0238813 | A1* | 9/2010 | Allan | H04L 12/437 370/252 |
| 2011/0091201 | A1* | 4/2011 | Yan | H04J 3/085 398/3 |
| 2011/0116365 | A1* | 5/2011 | Wu | H04L 12/437 370/223 |
| 2011/0158241 | A1* | 6/2011 | Wang | H04L 12/42 370/395.53 |
| 2012/0155484 | A1* | 6/2012 | Sergeev | H04L 12/437 370/405 |
| 2012/0188912 | A1* | 7/2012 | Chen | H04L 12/40032 370/258 |
| 2013/0258840 | A1* | 10/2013 | Holness | H04L 49/00 370/222 |
| 2015/0036546 | A1* | 2/2015 | Singh | H04L 41/12 370/258 |

FOREIGN PATENT DOCUMENTS

| | | |
|---|---|---|
| CN | 102035712 A | 4/2011 |
| CN | 102437957 A | 5/2012 |
| EP | 1528731 A2 | 5/2005 |
| WO | 2006030435 A2 | 3/2006 |

OTHER PUBLICATIONS

"Series G: Transmission Systems and Media, Digital Systems and Networks; Digital Transmission Systems—Digital Networks—SDH Network Characteristics," ITU-T Telecommunication Standardization Sector of ITU, G.842, Apr. 1997, 40 pages.

Liu, G., et al., "MPLS-TP Protection for Interconnected Rings; Draft-liu-mpls-tp-Interconnected-Ring-Protection-00," MPLS Working Group, Oct. 24, 2011, 12 pages.

* cited by examiner

METHOD AND DEVICE FOR PROCESSING INTERCONNECTED RING IN MULTI-PROTOCOL LABEL SWITCHING

This application is a continuation of International Application No. PCT/CN2012/082604, filed on Oct. 9, 2012, which claims priority to Chinese Patent Application No. 201110424163.9, filed on Dec. 16, 2011, each of which is hereby incorporated by reference in its entirety.

TECHNICAL FIELD

The present invention relates to the field of communications technologies and, in particular embodiments, to a method and a device for processing an interconnected ring in multi-protocol label switching.

BACKGROUND

An MPLS (multi-protocol label switching) technology is a technology adopting a label switching technology to implement rapid switching and transmission of a packet service. Conventionally, an MPLS network adopts technologies, such as FRR (fast reroute) and APS (automatic protection switching), to protect a network.

However, in a process of applying the foregoing MPLS in a ring network, the inventor finds that the prior art has at least the following problems. With increasing applications of a networking manner that an access ring, an aggregation ring and a core ring are embedded layer by layer, a configuration workload and a network resource overhead of the technologies, such as the FRR and the APS, also becomes larger, and a multi-point fault protection capacity still needs to be improved.

SUMMARY

Embodiments of the present invention provide a method and a device for processing an interconnected ring in multi-protocol label switching, which effectively lowers a network resource overhead, and improves processing efficiency of an interconnected ring of a cross-ring service.

The embodiments of the present invention adopt the following technical solutions.

A method can be used for processing an interconnected ring in multi-protocol label switching. To-be-processed services are classified as a single ring service for an original ring and a cross-ring service for an interconnected ring corresponding to the original ring, Information is determined about a virtual point corresponding to the interconnected ring and a virtual channel of the original ring is created according to the information about the virtual point. The virtual channel is used to forward the cross-ring service to the interconnected ring and the single ring service is processed according to a pre-created actual channel of the original ring.

A device can be used for processing an interconnected ring in multi-protocol label switching. A first classifying unit is configured to classify to-be-processed services as a single ring service for an original ring and a cross-ring service for an interconnected ring corresponding to the original ring. A first creating unit is configured to determine information about a virtual point corresponding to the interconnected ring and to create a virtual channel of the original ring according to the information about the virtual point. A first cross-ring processing unit is configured to forward the cross-ring service to the interconnected ring according to the virtual channel created by the first creating unit. The cross-ring service is obtained through classification of the first classifying unit. A first single ring processing unit is configured to process the single ring service according to a pre-created actual channel of the original ring. The single ring service is obtained through classification of the first classifying unit.

With the method and device for processing an interconnected ring in multi-protocol label switching provided in the embodiments of the present invention, the to-be-processed services are pre-classified as the single ring service for the original ring and the cross-ring service for the interconnected ring, the virtual channel is used to forward the cross-ring service, and the actual channel is used to process the single ring service, so that an interconnected node of the original ring and the interconnected ring does not need to be configured with processing information of the single ring service, which reduces calculation amount at the interconnected node, lowers a network resource overhead, and improves processing efficiency of the interconnected ring of the cross-ring service. Therefore, by using the technical solutions in the embodiments of the present invention, the network resource overhead is effectively lowered, and the processing efficiency of the interconnected ring of the cross-ring service is improved.

The embodiments of the present invention further adopt the following technical solutions.

A method can be used for processing an interconnected ring in multi-protocol label switching. To-be-processed connectivity checks are classified as a single ring connectivity check for an original ring and a cross-ring connectivity check for an interconnected ring corresponding to the original ring. Information is determined about a virtual point corresponding to the interconnected ring and a virtual channel of the original ring is created according to the information about the virtual point. The virtual channel is used to forward the cross-ring connectivity check to the interconnected ring and the single ring connectivity check is processed according to a pre-created actual channel of the original ring.

A device can be used for processing an interconnected ring in multi-protocol label switching. A second classifying unit is configured to classify to-be-processed connectivity checks as a single ring connectivity check for an original ring and a cross-ring connectivity check for an interconnected ring corresponding to the original ring. A second creating unit is configured to determine information about a virtual point corresponding to the interconnected ring and to create a virtual channel of the original ring according to the information about the virtual point. A second cross-ring processing unit is configured to use the virtual channel created by the second creating unit to forward the cross-ring connectivity check to the interconnected ring. The cross-ring connectivity check is obtained through classification of the second classifying unit. A second single ring processing unit is configured to process the single ring connectivity check according to a pre-created actual channel of the original ring. The single ring connectivity check is obtained through classification of the second classifying unit.

It can be seen from the foregoing descriptions that, the to-be-processed connectivity checks are pre-classified as the single ring connectivity check for the original ring and the cross-ring connectivity check for the interconnected ring, the virtual channel is used to process the cross-ring connectivity check, and the actual channel is used to process the single ring connectivity check, so that a state of a connection between any two nodes on the original ring and the interconnected ring can be detected at any time when no service is processed, flexibility of detecting a state of a connection between any two nodes on the original ring and the interconnected ring is improved, and an interconnected node between the original ring and the interconnected ring does not need to be configured with processing information of the single ring connectivity check, which reduces calculation amount at the interconnected node, and lowers a network resource overhead. Therefore, by using the technical solutions in the embodiments of the present invention, the flexibility of detecting a state of a connection between any two nodes on the original ring and the interconnected ring is improved, and the network resource overhead is effectively lowered.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
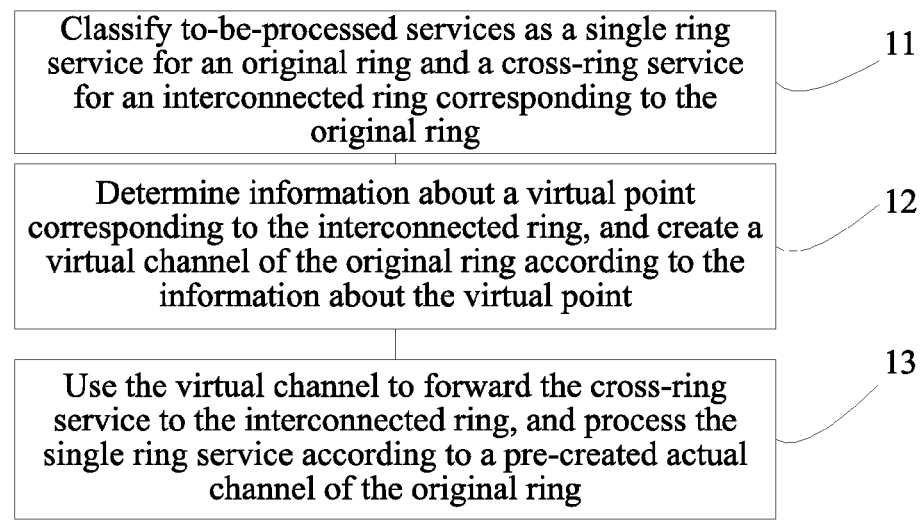
FIG. 1 is a flow chart of a method for processing an interconnected ring in multi-protocol label switching according to Embodiment 1 of the present invention.

As shown in FIG. 1, Embodiment 1 of the present invention provides a method for processing an interconnected ring in multi-protocol label switching, which includes the following steps.

Step 11: Classify to-be-processed services as a single ring service for an original ring and a cross-ring service for an interconnected ring corresponding to the original ring.

In the embodiment, one physical ring in any two interconnected physical rings may be used as the original ring, and the other physical ring is used as the interconnected ring corresponding to the original ring.

When the to-be-processed services arrive at an on-ring node of the original ring, the to-be-processed services are classified as a single ring service for the original ring and a cross-ring service for the interconnected ring according to service labels of the to-be-processed services. The single ring service refers to a service of which both an on-ring node and an off-ring node are located on the original ring. The cross-ring service refers to a service of which an on-ring node is located on the original ring, and an off-ring node is not located on the original ring. In the embodiment, the on-ring node of the cross-ring service is located on the original ring, and the off-ring node is located on the interconnected ring.

Step 12: Determine information about a virtual point corresponding to the interconnected ring, and create a virtual channel of the original ring according to the information about the virtual point.

The virtual point is not an actual node on a physical ring, but is an abstract logic node. In addition, any interconnected ring corresponding to the original ring has a unique virtual point corresponding to the interconnected ring. For example, there are two physical rings interconnected with the original ring, which are called a first interconnected ring and a second interconnected ring, and there are a first virtual point corresponding to the first interconnected ring, and a second virtual point corresponding to the second interconnected ring. Herein, for the first interconnected ring, the first virtual point is unique, and for the second interconnected ring, the second virtual point is also unique.

In the embodiment, the information about the virtual point may include an identification ID of the virtual point, an identification ID of the original ring, an identification ID of the interconnected ring, an identification ID of the first interconnected node, an identification ID of the second interconnected node, and the like. The first interconnected node and the second interconnected node are two interconnected nodes of the original ring and the interconnected ring.

The virtual channel may include an RCW (clockwise working of ring) channel, a RAP (anticlockwise protection of ring) channel, a RAW (Anticlockwise Working of Ring, anticlockwise working of ring) channel and an RCP (clockwise protection of ring) channel through which any node except the two interconnected nodes of the original ring arrives at the first interconnected node, and an RCW channel, a RAP channel, a RAW channel and an RCP channel through which any node except the two interconnected nodes of the original ring arrives at the second interconnected node.

Step 13: Use the virtual channel to forward the cross-ring service to the interconnected ring, and process the single ring service according to a pre-created actual channel of the original ring.

Specifically, it may be determined, according to reachability determining information, whether a first reachable virtual channel for forwarding the cross-ring service through the first interconnected node exists. The reachability determining information includes a topology of the interconnected ring, fault information of the interconnected ring and an identification ID of an off-ring node of the cross-ring service. Preferably, the first reachable virtual channel may include an RCW channel and a RAP channel, and in this case, a priority of the RCW channel is higher than a priority of the RAP channel, that is, the RAP channel may serve as an alternative channel of the RCW channel. Or, the first reachable virtual channel may also include a RAW channel and an RCP channel, and in this case, a priority of the RAW channel is higher than a priority of the RCP channel, that is, the RCP channel may serve as an alternative channel of the RAW channel. The first reachable virtual channel may forward the cross-ring service from the on-ring node of the cross-ring service to the first interconnected node, and in this case, a pre-created actual channel exists on the interconnected ring, so that the cross-ring service can be processed successfully after getting on the ring at the first interconnected node of the interconnected ring.

If the first reachable virtual channel exists, the first reachable virtual channel is used to forward the cross-ring service from the on-ring node of the cross-ring service to the first interconnected node; then, a label of the original ring of the cross-ring service is popped (pop) up at the first interconnected node, a service label of the cross-ring service of which the label of the original ring is popped up is swapped (swap), a label of the interconnected ring is pushed in (push) the cross-ring service; and the cross-ring service in which the label of the interconnected ring is pushed enters the interconnected ring at the first interconnected node.

If the first reachable virtual channel does not exist, the cross-ring service is sent from the first interconnected node to the second interconnected node, and it is determined, according to the reachability determining information, whether a second reachable virtual channel for forwarding the cross-ring service through the second interconnected node exists. Preferably, the second reachable virtual channel may include an RCW channel and a RAP channel, and in this case, a priority of the RCW channel is higher than a priority of the RAP channel, that is, the RAP channel may serve as an alternative channel of the RCW channel. Or, the second reachable virtual channel may also include a RAW channel and an RCP channel, and in this case, a priority of the RAW channel is higher than a priority of the RCP channel, that is, the RCP channel may serve as an alternative channel of the RAW channel. The second reachable virtual channel may forward the cross-ring service from the on-ring node of the cross-ring service to the second interconnected node via the first interconnected node, and in this case, a pre-created actual channel exists on the interconnected ring, so that the cross-ring service can be processed successfully after getting on the ring at the second interconnected node of the interconnected ring.

If the second reachable virtual channel exists, the second reachable virtual channel is used to forward the cross-ring service. A process that the second reachable virtual channel is used to process the cross-ring service is the same as a process that the first reachable virtual channel is used to process the cross-ring service, and details are not described herein again.

If the second reachable virtual channel does not exist, the cross-ring service is discarded.

In a practical application, the technical solution in the embodiment of the present invention may not only be applied to processing of an interconnected ring in MPLS, but also be applied to processing of an interconnected ring in another type of ring network.

It can be seen from the foregoing description that, the to-be-processed services are pre-classified as the single ring service for the original ring and the cross-ring service for the interconnected ring, the virtual channel is used to process the cross-ring service, and the actual channel is used to process the single ring service, so that an interconnected node of the original ring and the interconnected ring does not need to be configured with processing information of the single ring service, which reduces calculation amount at the interconnected node, lowers a network resource overhead, and improves processing efficiency of the interconnected ring of the cross-ring service. Therefore, by using the technical solution in the embodiment of the present invention, the network resource overhead is effectively lowered, and the processing efficiency of the interconnected ring of the cross-ring service is improved.

In addition, if the off-ring node of the cross-ring service is not located on the interconnected ring, but is located on another physical ring corresponding to the interconnected ring, the interconnected ring is called a target original ring, the another physical ring corresponding to the interconnected ring is called a target interconnected ring corresponding to the target original ring, and in this case, the cross-ring service may be used as a target cross-ring service which gets on the ring from the target original ring and gets off the ring from the target interconnected ring. In a specific application, the target cross-ring service for the target interconnected ring may be processed according to the method of processing an interconnected ring in multi-protocol label switching as described in the foregoing Embodiment 1, that is, a created virtual channel on the target original ring is used to forward the target cross-ring service to the target interconnected ring.

Figure 2:
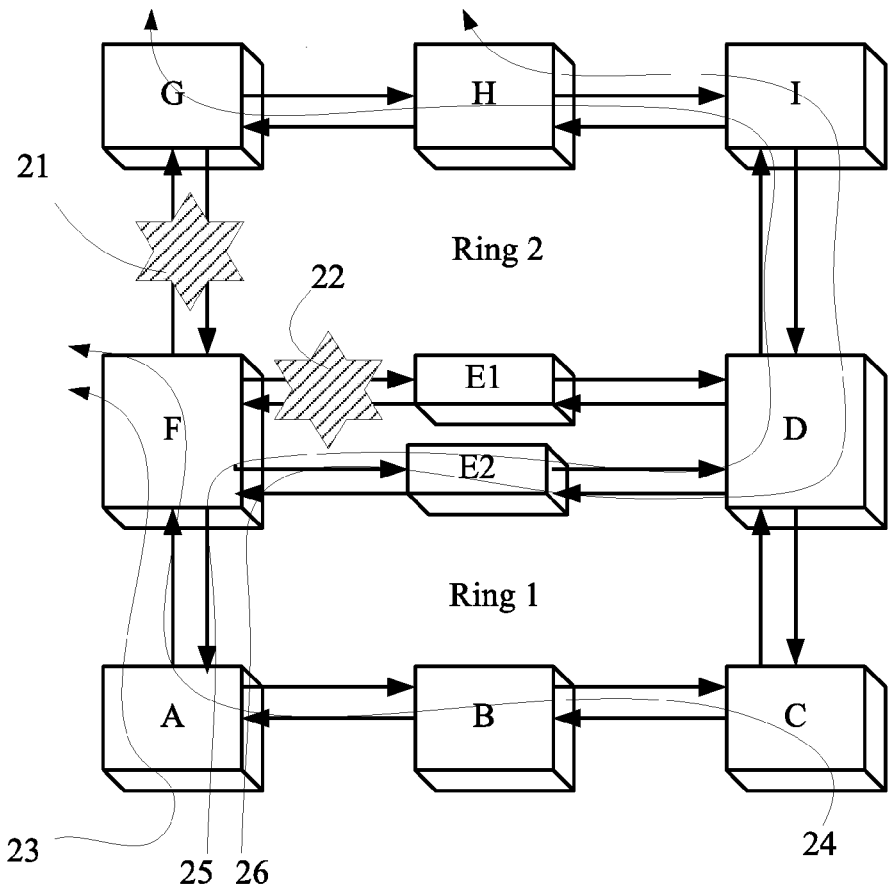
FIG. 2 is a schematic diagram of MPLS interconnected ring service processing according to Embodiment 2 of the present invention.

As shown in FIG. 2, a ring 1 and a ring 2 are two interconnected physical rings. The ring 1 may be used as an original ring, and the ring 2 may be used as an interconnected ring corresponding to the ring 1. The ring 1 has a node A, a node B, a node C, a node D, a node E2 and a node F, and the ring 2 has a node F, a node E1, a node D, a node I, a node H and a node G. Interconnected nodes of the ring 1 and the ring 2 are the node F and the node D. Moreover, a fault 21 exists between the node F and the node G, and a fault 22 exists between the node F and the node E1. In FIG. 2, it can be further seen that, a service 23, a service 25 and a service 26 gets on the ring from the node A, and a service 24 gets on the ring from the node C. The following Embodiment 2 is described with reference to FIG. 2.

Figure 3:
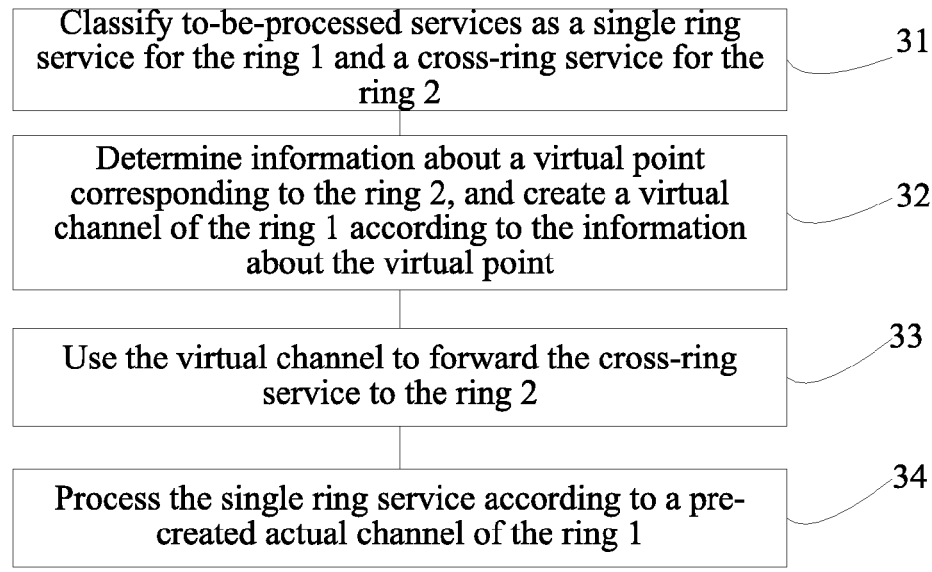
FIG. 3 is a flow chart of a method for processing an interconnected ring in multi-protocol label switching according to Embodiment 2 of the present invention.

As shown in FIG. 3, Embodiment 2 of the present invention provides a method for processing an interconnected ring in multi-protocol label switching, which includes the following steps.

Step 31: Classify to-be-processed services as a single ring service for the ring 1 and a cross-ring service for the ring 2.

In the embodiment, the to-be-processed services include the service 23, the service 24, the service 25 and the service 26. An on-ring node and an off-ring node of the service 23 are the node A and the node F respectively, an on-ring node and an off-ring node of the service 24 are the node C and the node F respectively, an on-ring node and an off-ring node of the service 25 are the node A and the node G respectively, and an on-ring node and an off-ring node of the service 26 are the node A and the node H respectively.

As shown in FIG. 2, when the service 23, the service 25 and the service 26 get on the ring from the node A, the service 23 is classified as the single ring service for the ring 1, and the service 25 and the service 26 are classified as the cross-ring services for the ring 2 according to service labels of the service 23, the service 25 and the service 26. In the same way, when the service 24 gets on the ring from the node C, the service 24 is classified as the single ring service for the ring 1 according to a service label of the service 24.

Step 32: Determine information about a virtual point corresponding to the ring 2, and create a virtual channel of the ring 1 according to the information about the virtual point.

The information about the virtual point includes an identification ID of the virtual point, an identification ID of the ring 1, an identification ID of the ring 2, an identification ID of the node F, an identification ID of the node D and the like.

In the embodiment, preferably, the virtual channel includes an RCW channel, a RAP channel, a RAW channel and an RCP channel through which any node except the node F and the node D on the ring 1 arrives at the node F, and an RCW channel, a RAP channel, a RAW channel and an RCP channel through which any node except the node F and the node D on the ring 1 arrives at the node D. A priority of the RCW channel is higher than a priority of the RAP channel, that is, when the RCW channel is not reachable, the RAP channel may serve as an alternative channel of the RCW channel. A priority of the RAW channel is higher than a priority of the RCP channel, that is, when the RAW channel is not reachable, the RCP channel may serve as an alternative channel of the RAW channel.

Step 33: Use the virtual channel to forward the cross-ring service to the ring 2.

With reference to FIG. 2, when the service 25 is processed, first, the on-ring node and the off-ring node of the service 25 are determined as the node A and the node G respectively; then, it may be determined, according to reachability determining information, whether a first reachable virtual channel for forwarding the service 25 through the node F exists. The reachability determining information includes a topology of the ring 2, fault information of the ring 2 and an identification ID of the off-ring node G of the service 25. Herein, the first reachable virtual channel for forwarding the service 25 may forward the service 25 from the on-ring node A of the service 25 to the node F, and meanwhile, a pre-created actual channel exists on the ring 2, so that the service 25 can be successfully forwarded to the node G after entering the ring 2 from the node F, and gets off the ring at the node G. Preferably, the first reachable virtual channel may be a first reachable RCW channel or a first reachable RAP channel, where the first reachable RAP channel is an alternative channel of the first reachable RCW channel. The pre-created actual channel of the ring 2 may be the RCW channel or the RAP channel, where the RAP channel is an alternative channel of the RCW channel.

It can be known with reference to FIG. 2 that, a clockwise working of ring channel A-F may be used to forward the service 25 from the on-ring node A of service 25 to the node F, however, because the fault 21 exists between the node F and the node G and the fault 22 exists between the node F and the node E1, the RCW channel or the RAP channel for forwarding the service 25 from the node F to the node G does not exist in the pre-created actual channel of the ring 2. In this case, it is determined that the first reachable virtual channel for forwarding the service 25 through the node F does not exist, and the service 25 is forwarded from the node F to the node D via the node E2.

Further, it is determined, according to the reachability determining information, whether a second reachable virtual channel for forwarding the service 25 through the node D exists. Herein, the second reachable virtual channel for forwarding the service 25 may forward the service 25 from the on-ring node A of the service 25 to the node D, and meanwhile, a pre-created actual channel exists on the ring 2, so that the service 25 can be successfully forwarded to the node G after entering the ring 2 at the node D, and gets off the ring at the node G. Preferably, the second reachable virtual channel may be a second reachable RCW channel or a second reachable RAP channel, where the second reachable RAP channel is an alternative channel of the second reachable RCW channel.

Because the fault 22 exists between the node E1 and the node F, the RCW channel for forwarding the service 25 from the node D to the node G does not exist in the pre-created actual channel of the ring 2, however, the RAP channel for forwarding the service 25 from the node D to the node G, that is, a channel D-I-H-G, exists. Therefore, it is determined that the second reachable virtual channel for forwarding the service 25 through the node D exists, that is, a second reachable RCW channel. Herein, the second reachable RCW channel is specifically a channel A-F-E2-D.

Specifically, when the service 25 passes through the node D, a label of the ring 1 of the service 25 is first popped up, then, a service label of the service 25 of which the label of the ring 1 is popped up is swapped, then, a label of the ring 2 is pushed in the service 25, and finally, the service 25 in which the label of the ring 2 is pushed in enters the ring 2 at the node D.

Therefore, the second reachable RCW channel, that is, the channel A-F-E2-D, may be used to forward the service 25 to the ring 2, and then the actual channel D-I-H-G of the ring 2 is used to forward the service 25 to the node G, and the service 25 gets off the ring at the node G, so as to complete processing of the service 25.

For a process for processing the service 26, reference may be made to a method for processing the service 25, and details are not described herein again.

Step 34: Process the single ring service according to a pre-created actual channel of the ring 1.

In the embodiment, preferably, the pre-created actual channel of the ring 1 may also include an RCW channel, a RAP channel, a RAW channel and an RCP channel. A priority of the RCW channel is higher than a priority of the RAP channel, that is, when the RCW channel is not reachable, the RAP channel serve as an alternative channel of the RCW channel. A priority of the RAW channel is higher than a priority of the RCP channel, that is, when the RAW channel is not reachable, the RCP channel may serve as an alternative channel of the RCW channel.

With reference to FIG. 2, when the service 23 is processed, because the on-ring node and the off-ring node of the service 23 are the node A and the node F respectively, the RCW channel in the pre-created actual channel of the ring 1 is used to forward the service 23 from the node A to the node F, and the service 23 gets off the ring at the node F, so as to complete processing of the single ring service 23.

When the service 24 is processed, because the on-ring node and the off-ring node of the service 24 are the node C and the node F respectively, the RCW channel in the pre-created actual channel of the ring 1 is used to send out the service 24 from the node C and forward the service 24 to the node F via the node B and the node A, and the service 24 gets off the ring at the node F, so as to complete processing of the service 24.

It can be seen from the foregoing description that, the to-be-processed services are pre-classified as the single ring service for the original ring and the cross-ring service for the interconnected ring, the virtual channel is used to process the cross-ring service, and the actual channel is used to process the single ring service, so that an interconnected node of the original ring and the interconnected ring does not need to be configured with processing information of the single ring service, which reduces calculation amount at the interconnected node, lowers a network resource overhead, and improves processing efficiency of the interconnected ring of the cross-ring service. Therefore, by using the technical solution in the embodiment of the present invention, the network resource overhead is effectively lowered, and the processing efficiency of the interconnected ring of the cross-ring service is improved.

Figure 4:
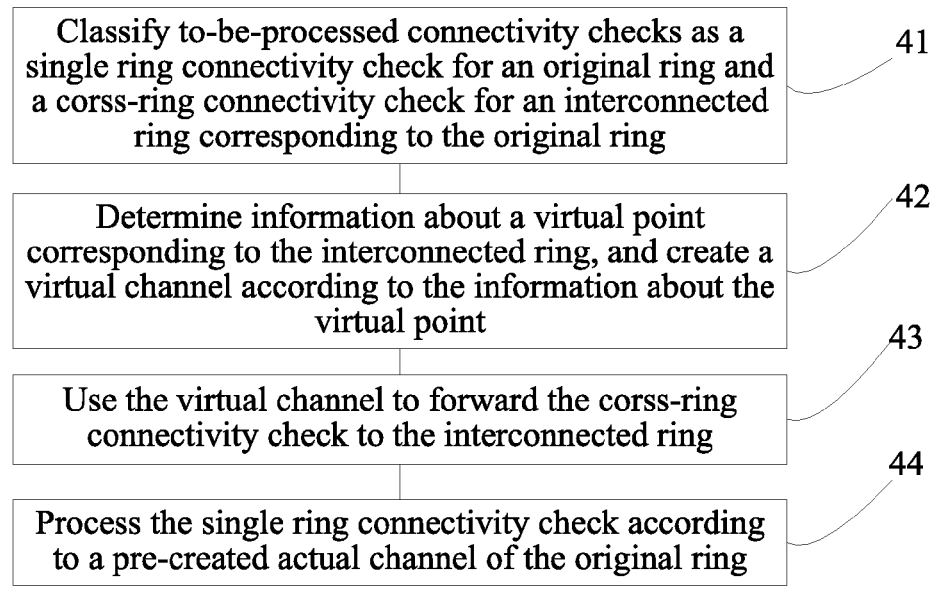
FIG. 4 is a flow chart of a method for processing an interconnected ring in multi-protocol label switching according to Embodiment 3 of the present invention.

As shown in FIG. 4, Embodiment 3 of the present invention provides a method for processing an interconnected ring in multi-protocol label switching, which includes the following steps.

Step 41: Classify to-be-processed connectivity checks as a single ring connectivity check for an original ring and a cross-ring connectivity check for an interconnected ring corresponding to the original ring.

In the embodiment, one physical ring in any two interconnected physical rings may be used as the original ring, and the other physical ring is used as the interconnected ring corresponding to the original ring.

The to-be-processed connectivity checks include a to-be-processed connectivity check performed by a starting node for a destination node. The starting node may be any node on the original ring, and the destination node may be any node on the original ring or any node on the interconnected ring. Specifically, when a destination node for which a connectivity check is performed is any node on the original ring, the connectivity check is the single ring connectivity check; and when a destination node for which a connectivity check is performed is any node on the interconnected ring, the connectivity check is the cross-ring connectivity check.

Figure 5:
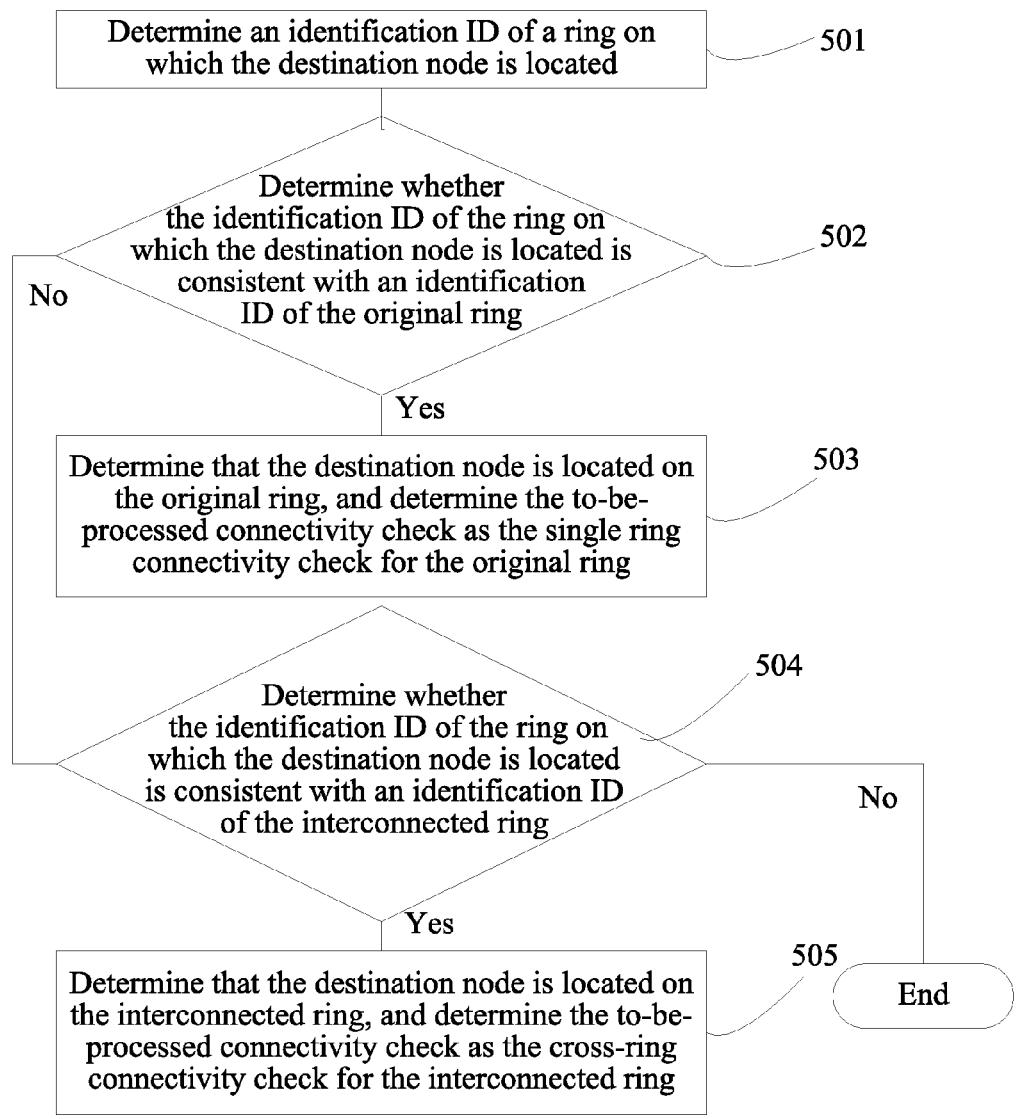
FIG. 5 is a flow chart of a method for classifying to-be-processed connectivity checks as a single ring connectivity check and a cross-ring connectivity check according to Embodiment 3 of the present invention.

As shown in FIG. 5, step 41 may specifically include the following steps.

501: Determine an identification ID of a ring on which the destination node is located.

502: Determine whether the identification ID of the ring on which the destination node is located is consistent with an identification ID of the original ring. If the identification ID of the ring on which the destination node is located is consistent with the identification ID of the original ring, step 503 is executed; and if the identification ID of the ring on which the destination node is located is inconsistent with the identification ID of the original ring, step 504 is executed.

503: Determine that the destination node is located on the original ring, and determine the to-be-processed connectivity check as the single ring connectivity check for the original ring.

504: Determine whether the identification ID of the ring on which the destination node is located is consistent with an identification ID of the interconnected ring. If the identification ID of the ring on which the destination node is located is consistent with the identification ID of the interconnected ring, step 505 is executed; and if the identification ID of the ring on which the destination node is located is inconsistent with the identification ID of the interconnected ring, the procedure is ended.

505: Determine that the destination node is located on the interconnected ring, and determine the to-be-processed connectivity check as the cross-ring connectivity check for the interconnected ring.

In the foregoing steps 501-505, first, it is determined whether the identification ID of the ring on which the destination node is located is consistent with the identification ID of the original ring; if the identification ID of the ring on which the destination node is located is inconsistent with the identification ID of the original ring, then, it is determined whether the identification ID of the ring on which the destination node is located is consistent with the identification ID of the interconnected ring; and then, a next operation is executed. In a practical application, first, it may also be determined whether the identification ID of the ring on which the destination node is located is consistent with the identification ID of the interconnected ring; if the identification ID of the ring on which the destination node is located is inconsistent with the identification ID of the interconnected ring, then, it is determined whether the identification ID of the ring on which the destination node is located is consistent with the identification ID of the original ring.

Step 42: Determine information about a virtual point corresponding to the interconnected ring, and create a virtual channel according to the information about the virtual point.

The virtual point is not an actual node on a physical ring, but is an abstract logic node. In addition, any interconnected ring corresponding to the original ring has a unique virtual point corresponding to the interconnected ring. For example, there are two physical rings interconnected with the original ring, which are called a first interconnected ring and a second interconnected ring, and there are a first virtual point corresponding to the first interconnected ring, and a second virtual point corresponding to the second interconnected ring. Herein, for the first interconnected ring, the first virtual point is unique, and for the second interconnected ring, the second virtual point is also unique.

The information about the virtual point may include an identification ID of the virtual point, the identification ID of the original ring, the identification ID of the interconnected ring, an identification ID of the first interconnected node and an identification ID of the second interconnected node. The first interconnected node and the second interconnected node are two interconnected nodes of the original ring and the interconnected ring.

In the embodiment, the virtual channel may include an RCW channel, a RAP channel, a RAW channel and an RCP channel through which any node except the two interconnected nodes of the original ring arrives at the first interconnected node, and an RCW channel, a RAP channel, a RAW channel and an RCP channel through which any node except the two interconnected nodes of the original ring arrives at the second interconnected node.

Step 43: Use the virtual channel to forward the cross-ring connectivity check to the interconnected ring.

Specifically, it may be determined, according to connection determining information, whether a first connection virtual channel for forwarding the cross-ring connectivity check through the first interconnected node exists. The connection determining information includes a topology of the interconnected ring, fault information of the interconnected ring and an identification ID of the destination node. Preferably, the first connection virtual channel may include an RCW channel and a RAP channel, and in this case, a priority of the RCW channel is higher than a priority of the RAP channel, that is, the RAP channel may serve as an alternative channel of the RCW channel. Or, the first connection virtual channel may also include a RAW channel and an RCP channel, and in this case, a priority of the RAW channel is higher than a priority of the RCP channel, that is, the RCP channel may serve as an alternative channel of the RAW channel. The first connection virtual channel may forward the cross-ring connectivity check from the starting node to the first interconnected node, and meanwhile, a pre-created actual channel which can successfully forward the cross-ring connectivity check from the first interconnected node to the destination node exists on the interconnected ring.

If the first connection virtual channel exists, the first connection virtual channel is used to forward the cross-ring connectivity check to the interconnected ring; and if the first connection virtual channel does not exist, the cross-ring connectivity check is sent from the first interconnected node to the second interconnected node, and it is determined, according to the connection determining information, whether a second connection virtual channel for forwarding the cross-ring connectivity check through the second interconnected node exists. Preferably, the second connection virtual channel may include an RCW channel and a RAP channel, and in this case, a priority of the RCW channel is higher than a priority of the RAP channel, that is, the RAP channel may serve as an alternative channel of the RCW channel. Or, the second connection virtual channel may also include a RAW channel and an RCP channel, and in this case, a priority of the RAW channel is higher than a priority of the RCP channel, that is, the RCP channel may serve as an alternative channel of the RAW channel. The second connection virtual channel may forward the cross-ring connectivity check from the starting node to the second interconnected node via the first interconnected node, and meanwhile, a pre-created actual channel which can successfully forward the cross-ring connectivity check from the second interconnected node to the destination node exists on the interconnected ring.

If the second connection virtual channel exists, the second connection virtual channel is used to forward the cross-ring connectivity check; and if the second connection virtual channel does not exist, the cross-ring connectivity check is discarded.

Figure 6:
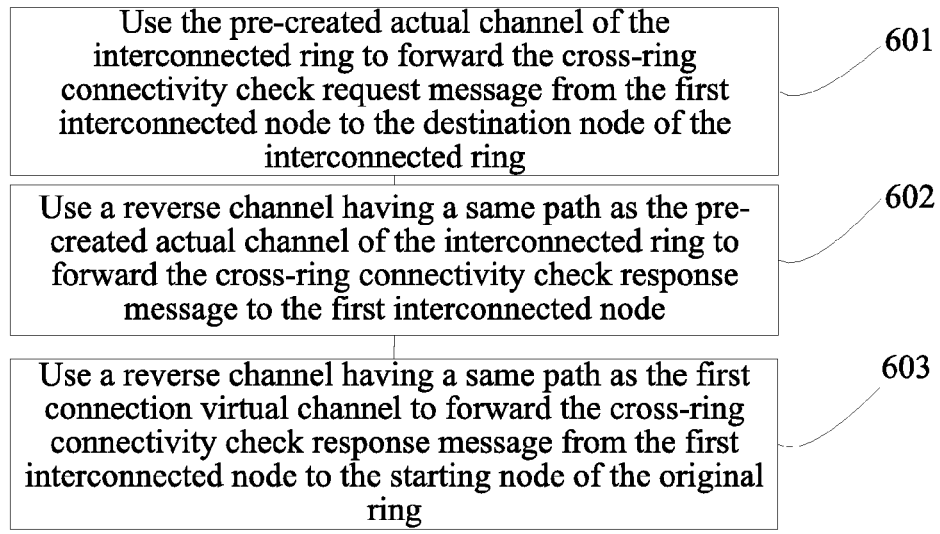
FIG. 6 is a flow chart of a method for forwarding a cross-ring connectivity check according to a virtual channel according to Embodiment 3 of the present invention.

In a specific application, the cross-ring connectivity check may be a cross-ring connectivity check request message sent by the starting node of the original ring to the destination node of the interconnected ring. In this case, if the first connection virtual channel for forwarding the cross-ring connectivity check request message from the starting node of the original ring to the first interconnected node exists, where the cross-ring connectivity check request message carries the identification ID of the original ring, an identification ID of the starting node, the identification ID of the interconnected ring, the identification ID of the destination node, a connection direction, and the like, as shown in FIG. 6, after step 43, the method may further include the following steps:

Step 601: Use the pre-created actual channel of the interconnected ring to forward the cross-ring connectivity check request message from the first interconnected node to the destination node of the interconnected ring.

After the destination node of the interconnected ring receives the cross-ring connectivity check request message, a cross-ring connectivity check response message of the destination node of the interconnected ring for the starting node of the original ring is constructed.

Step 602: Use a reverse channel having a same path as the pre-created actual channel of the interconnected ring to forward the cross-ring connectivity check response message to the first interconnected node.

Step 603: Use a reverse channel having a same path as the first connection virtual channel to forward the cross-ring connectivity check response message from the first interconnected node to the starting node of the original ring.

Both the virtual channel and the actual channel have two channels with opposite directions and a same path. If a channel in one direction is called a forward channel, a channel in the other direction is called a reverse channel.

Step 44: Process the single ring connectivity check according to the pre-created actual channel of the original ring.

Figure 7:
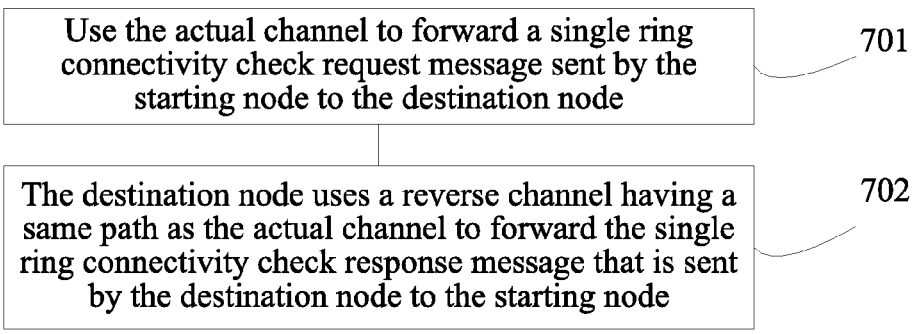
FIG. 7 is a flow chart of a method for processing a single ring connectivity check according to an actual channel according to Embodiment 3 of the present invention.

As shown in FIG. 7, when the single ring connectivity check is a single ring connectivity check request message sent by a starting node to a destination node, where both the starting node and the destination node are on the original ring, step 44 may specifically include:

701: Use the actual channel to forward the single ring connectivity check request message sent by the starting node to the destination node. The single ring connectivity check request message carries the identification ID of the original ring, an identification ID of the starting node, an identification ID of the destination node, the connection direction, and the like. The actual channel may include the RCW channel, the RAP channel, the RAW channel and the RCP channel.

After the destination node receives the single ring connectivity check request message, a single ring connectivity check response message is constructed.

702: The destination node uses a reverse channel having a same path as the actual channel to forward the single ring connectivity check response message that is sent by the destination node to the starting node.

In a practical application, the single ring connectivity check request message or the cross-ring connectivity check request message may be a Ping request packet.

In addition, the technical solution in the embodiment of the present invention may not only be applied to processing of an interconnected ring in MPLS, but also be applied to processing of an interconnected ring in another type of ring network.

It can be seen from the foregoing description that, the to-be-processed connectivity checks are pre-classified as the single ring connectivity check for the original ring and the cross-ring connectivity check for the interconnected ring, the virtual channel is used to process the cross-ring connectivity check, and the actual channel is used to process the single ring connectivity check, so that a state of a connection between any two nodes on the original ring and the interconnected ring can be detected at any time when no service is processed, flexibility of detecting a state of a connection between any two nodes on the original ring and the interconnected ring is improved, and an interconnected node between the original ring and the interconnected ring does not need to be configured with processing information of the single ring connectivity check, which reduces calculation amount at the interconnected node, and lowers a network resource overhead. Therefore, by using the technical solution in the embodiment of the present invention, the flexibility of detecting a state of a connection between any two nodes on the original ring and the interconnected ring is improved, and the network resource overhead is effectively lowered.

Figure 8:
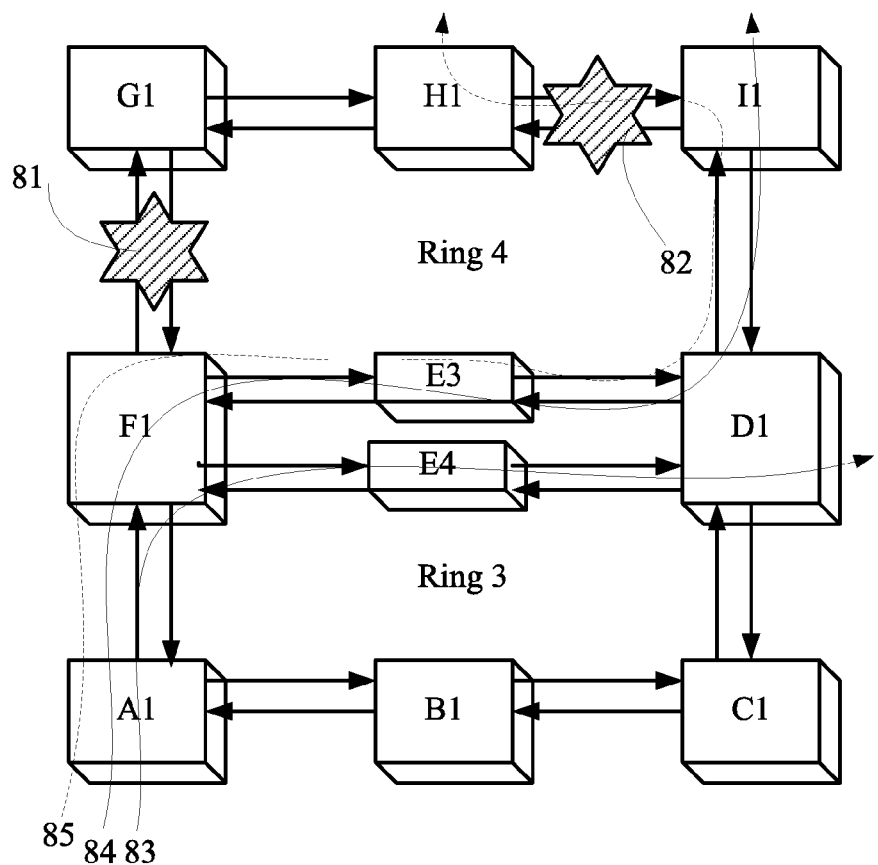
FIG. 8 is a schematic diagram of a connectivity check of an MPLS interconnected ring according to Embodiment 4 of the present invention.

As shown in FIG. 8, a ring 3 and a ring 4 are two interconnected ring channels. The ring 3 may be used as an original ring, and the ring 4 may be used as an interconnected ring corresponding to the ring 3. The ring 3 has a node A1, a node B1, a node C1, a node D1, a node E4 and a node F1, and the ring 4 has a node F1, a node E3, a node D1, a node I1, a node H1 and a node G1. Interconnected nodes of the ring 3 and the ring 4 are the node F1 and the node D1. Moreover, a fault 81 exists between the node F1 and the node G1, and a fault 82 exists between the node I1 and the node H1. It can be further seen from FIG. 8 that, the node A1 initiates a Ping request 83 to the node D1, the node A1 initiates a Ping request 84 to the node I1, and the node A1 initiates a Ping request 85 to the node H1. The following Embodiment 4 may be described with reference to FIG. 8.

Figure 9:
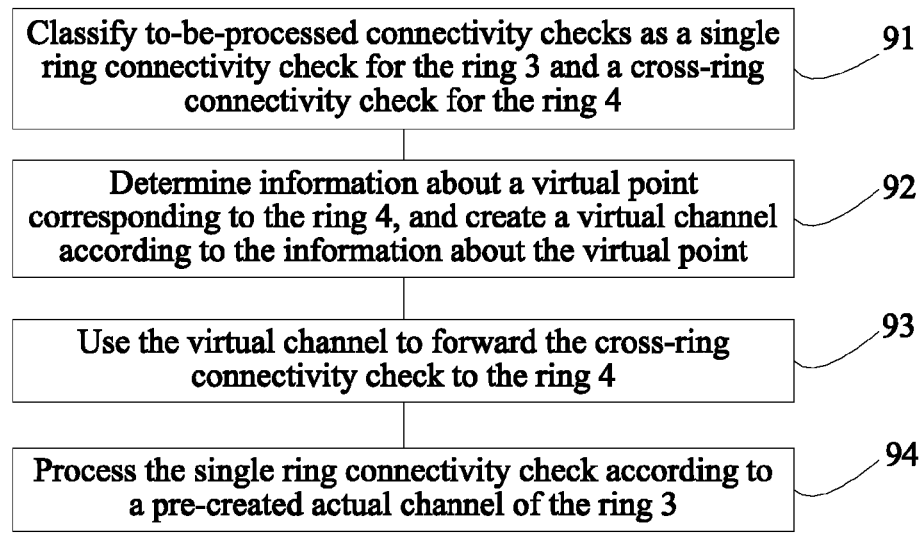
FIG. 9 is a flow chart of a method for processing an interconnected ring in multi-protocol label switching according to Embodiment 4 of the present invention.

As shown in FIG. 9, Embodiment 4 of the present invention provides a method for processing an interconnected ring in multi-protocol label switching, which includes the following steps.

Step 91: Classify to-be-processed connectivity checks as a single ring connectivity check for the ring 3 and a cross-ring connectivity check for the ring 4.

In the embodiment, the to-be-processed connectivity checks include the Ping request 83, the Ping request 84 and the Ping request 85. A starting node and a destination node of the Ping request 83 are the node A1 and the node D1 respectively, a starting node and a destination node of the Ping request 84 are the node A1 and the node I1 respectively, and a starting node and a destination node of the Ping request 85 are the node A1 and the node H1 respectively.

According to step 501 to step 505 in Embodiment 3, the Ping request 83 may be classified as the single ring connectivity check for the ring 3, and the Ping request 84 and the Ping request 85 are classified as the cross-ring connectivity checks for the ring 4.

Step 92: Determine information about a virtual point corresponding to the ring 4, and create a virtual channel according to the information about the virtual point.

The information about the virtual point of the ring 4 includes an identification ID of the virtual point, an identification ID of the ring 3, an identification ID of the ring 4, an identification ID of the node F1, an identification ID of the node D1, and the like.

In the embodiment, the virtual channel may include an RCW channel, a RAP channel, a RAW channel and an RCP channel.

Step 93: Use the virtual channel to forward the cross-ring connectivity check to the ring 4.

With reference to FIG. 8, when the Ping request 84 is processed, first, it is determined, according to connection determining information, whether a first connection virtual channel for forwarding the Ping request 84 through the node F1 exists. The connection determining information includes a topology of the ring 4, fault information of the ring 4 and an identification ID of the destination node I1 of the Ping request 84. Herein, the first connection virtual channel for forwarding the Ping request 84 may forward the Ping request 84 from the starting node A1 to the first interconnected node F1, and meanwhile, a pre-created actual channel which can successfully forward the Ping request 84 from the first interconnected node F1 to the destination node I1 exists on the ring 4. Preferably, the first connection virtual channel may be a first reachable RCW channel or a first reachable RAP channel, where the first reachable RAP channel is an alternative channel of the first reachable RCW channel. The pre-created actual channel of the ring 4 may include the RCW channel and the RAP channel, where the RAP channel is an alternative channel of the RCW channel.

Because the fault 81 exists between the node F1 and the node G1, the RCW channel for forwarding the Ping request 84 from the node F1 to the node I1 does not exist in the pre-created actual channel of the ring 4, however, the RAP channel for forwarding the Ping request 84 from the node F1 to the node I1, that is, a channel F1-E3-D1-I1, exists. Therefore, it is determined that the first connection virtual channel for forwarding the Ping request 84 through the node F1 exists, that is, a first connection RCW channel. Herein, the first connection RCW channel is specifically a channel A1-F1.

Then, after step 93, the method may further include the following steps:

Step 931: Use the channel F1-E3-D1-I1 to forward the Ping request 84 to the destination node I1.

After the destination node I1 receives the Ping request 84, a Ping response packet corresponding to the Ping request 84 is constructed. Both the Ping request 84 and the Ping response packet corresponding to the Ping request 84 may include the identification ID of the ring 3, an identification ID of the starting node A1, the identification ID of the ring 4, the identification ID of the destination node I1, a connection direction, an identification ID of a response ring, an identification ID of a response destination node. The identification ID of the response ring and the identification ID of the response destination node are invalid in the Ping request 84, but are valid in the Ping response packet corresponding to the Ping request 84. Moreover, the identification ID of the response ring is the same as the identification ID of the ring 4, and the identification ID of the response destination node is the same as the identification ID of the node I1.

Step 932: Use a reverse channel having a same path as the channel F1-E3-D1-I1 to forward the Ping response packet that is sent by the node I1 to the starting node A1 and corresponds to the Ping request 84. The reverse channel having the same path as the channel F1-E3-D1-I1 is a channel starting from the node I1 and arriving at the node F1 via the node D1 and the node E3.

Step 933: Use a reverse channel having a same path as the channel A1-F1 to continuously forward the Ping response packet corresponding to the Ping request 84. The reverse channel having the same path as the channel A1-F1 is a channel starting from the node F1 and arriving at the node A1.

A process for processing the Ping request 85 is similar to a process for processing the Ping request 84. Because the fault 81 exists between the node F1 and the node G1 and the fault 82 exists between the node I1 and the node H1, the cross-ring Ping request 85 is eventually discarded, and details are not described herein again.

Step 94: Process the single ring connectivity check according to a pre-created actual channel of the ring 3.

In the embodiment, the pre-created actual channel of the ring 3 may include an RCW channel, a RAP channel, a RAW channel and an RCP channel.

Further, with reference to FIG. 8, when the Ping request 83 is processed, because the starting node and the destination node of the Ping request 83 are the node A1 and the node D1 respectively, preferably, the RCW channel in the actual channel, that is, a channel A1-F1-E4-D1, is used to directly send out the Ping request 83 from the node A1 and forward the Ping request 83 to the node D1 via the node F1 and the node E4.

After the destination node D1 receives the Ping request 83, a Ping response packet corresponding to the Ping request 83 is constructed. Both the Ping request 83 and the Ping response packet corresponding to the Ping request 83 may include the identification ID of the ring 3, the identification ID of the starting node A1, an identification ID of the destination node D1, the connection direction, the identification ID of the response ring and the identification ID of the response destination node. The identification ID of the response ring and the identification ID of the response destination node are invalid in the Ping request 83, but are valid in the Ping response packet corresponding to the Ping request 83. The identification ID of the response ring is the same as the identification ID of the ring 3, and the identification ID of the response destination node is the same as the identification ID of the node D1.

Figure 10:
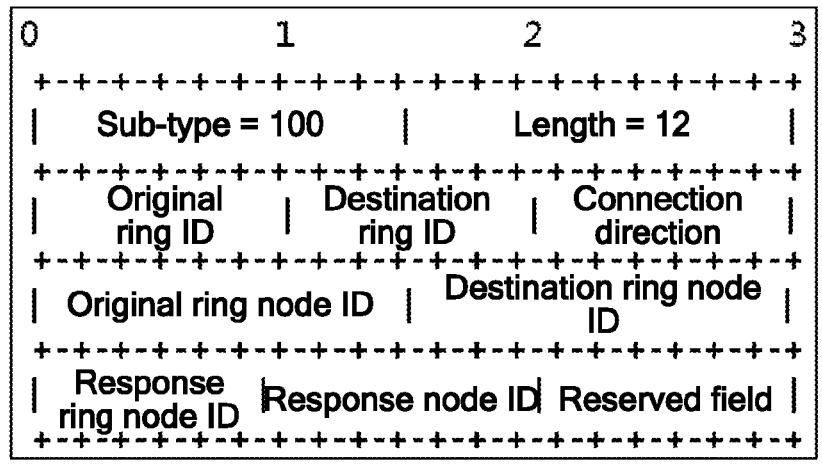
FIG. 10 is a schematic diagram of a protocol packet format of a Ping request according to Embodiment 4 of the present invention.

For example, in a practical application, for a protocol packet format of the Ping request, reference may be made to FIG. 10. In FIG. 10, it can be seen that a protocol packet of the Ping request may include a sub-type (sub-type), a length, an identification ID of an original ring, an identification ID of a destination ring, a connection direction, an identification ID of an original ring node, an identification ID of a destination ring node, an identification ID of a response ring, an identification ID of a response node and a reserved field. FIG. 8 is further used as an example for description. The identification ID of the original ring is the identification ID of the ring 3, the identification ID of the destination ring is the identification ID of the ring 4; and by using the Ping request 83 as an example, the identification ID of the original ring node is the identification ID of the node A1, the identification ID of the destination ring node is the identification ID of the node D1, in this case, the identification ID of the response ring is the identification ID of the ring 4, the identification ID of the response node is the identification ID of the node D1, and the connection direction is eastward, which may be indicated by a number "1".

In addition, as shown in Table 1, protocol packets of sub-Types (sub-type) 1-16 are protocol packets in an existing standard. Based on this, a sub-Type of a protocol packet of the Ping request may be defined as 100, a size of the protocol packet of the Ping request is defined as 12 bytes, and a value field of the protocol packet of the Ping request is set to SPRing (Share Protect Ring, share protect ring).

TABLE 1

| Sub-Type (sub-type) | Length (length) | Value Field (value field) |
| --- | --- | --- |
| 1 | 5 | LDP IPv4 prefix |
| 2 | 17 | LDP IPv6 prefix |
| 3 | 20 | RSVP IPv4 LSP |
| 4 | 56 | RSVP IPv6 LSP |
| 5 | Not | Assigned |
| 6 | 13 | VPN IPv4 prefix |
| 7 | 25 | VPN IPv6 prefix |
| 8 | 14 | L2 VPN endpoint |
| 9 | 10 | "FEC 128" Pseudowire (deprecated) |
| 10 | 14 | "FEC 128" Pseudowire |
| 11 | 16+ | "FEC 129" Pseudowire |
| 12 | 5 | BGP labeled IPv4 prefix |
| 13 | 17 | BGP labeled IPv6 prefix |
| 14 | 5 | Generic IPv4 prefix |
| 15 | 17 | Generic IPv6 prefix |
| 16 | 4 | Nil FEC |
| 100 | 12 | SPRing |

Then, a reverse channel having a same path as the channel A1-F1-E4-D1 is used to forward the Ping response packet that is sent by the destination node D1 to the starting node A1 and corresponds to the single ring Ping request 83. The reverse channel having the same path as the channel A1-F1-E4-D1 is a channel D1-E4-F1-A1, that is, a channel starting from the node D1 and arriving at the node A1 via the node E4 and the node F1.

It can be seen from the foregoing description that, the to-be-processed connectivity checks are pre-classified as the single ring connectivity check for the original ring and the cross-ring connectivity check for the interconnected ring, the virtual channel is used to process the cross-ring connectivity check, and the actual channel is used to process the single ring connectivity check, so that a state of a connection between any two nodes on the original ring and the interconnected ring can be detected at any time when no service is processed, flexibility of detecting a state of a connection between any two nodes on the original ring and the interconnected ring is improved, and an interconnected node between the original ring and the interconnected ring does not need to be configured with processing information of the single ring connectivity check, which reduces calculation amount at the interconnected node, and lowers a network resource overhead. Therefore, by using the technical solution in the embodiment of the present invention, the flexibility of detecting a state of a connection between any two nodes on the original ring and the interconnected ring is improved, and the network resource overhead is effectively lowered.

Figure 11:
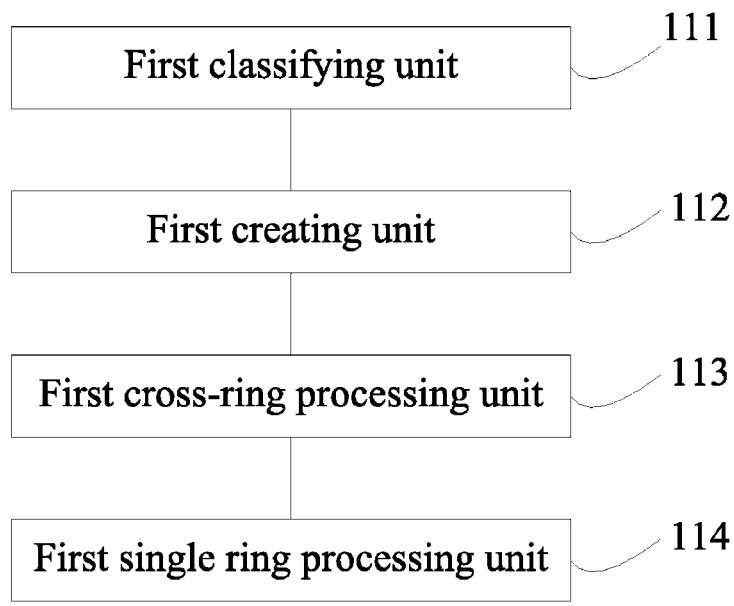
FIG. 11 is a schematic diagram of a device for processing an interconnected ring in multi-protocol label switching according to Embodiment 5 of the present invention.

As shown in FIG. 11, Embodiment 5 of the present invention provides a device for processing an interconnected ring in multi-protocol label switching, which includes: a first classifying unit 111, configured to classify to-be-processed services as a single ring service for an original ring and a cross-ring service for an interconnected ring corresponding to the original ring; a first creating unit 112, configured to determine information about a virtual point corresponding to the interconnected ring, and create a virtual channel of the original ring according to the information about the virtual point; a first cross-ring processing unit 113, configured to use the virtual channel created by the first creating unit 112 to forward the cross-ring service to the interconnected ring, where the cross-ring service is obtained through classification of the first classifying unit 111; and a first single ring processing unit 114, configured to process the single ring service according to a pre-created actual channel of the original ring, where the single ring service is obtained through classification of the first classifying unit 111.

The first classifying unit 111 is specifically configured to classify, at an on-ring node, the to-be-processed services as the single ring service for the original ring and the cross-ring service for the interconnected ring according to service labels of the to-be-processed services.

In the embodiment, the virtual channel includes an RCW channel, a RAP channel, a RAW channel and an RCP channel. The information about the virtual point may include an identification ID of the virtual point, an identification ID of the original ring, an identification ID of the interconnected ring, an identification ID of a first interconnected node and an identification ID of a second interconnected node.

Preferably, the first cross-ring processing unit 113 may include a determining module and a processing module. The determining module is configured to determine, according to reachability determining information, whether a first reachable virtual channel for forwarding the cross-ring service through the first interconnected node exists. The processing module is configured to: if the first reachable virtual channel exists, use the first reachable virtual channel to forward the cross-ring service; and if the first reachable virtual channel does not exist, send the cross-ring service from the first interconnected node to the second interconnected node. Preferably, the processing module is specifically configured to: if the first reachable virtual channel exists, use the first reachable virtual channel to forward the cross-ring service to the first interconnected node, pop up a label of the original ring of the cross-ring service, swap a service label of the cross-ring service of which the label of the original ring is popped up, push a label of the interconnected ring in the cross-ring service, and enable the cross-ring service in which the label of the interconnected ring is pushed to enter the interconnected ring at the first interconnected node.

The determining module is further configured to determine, according to the reachability determining information, whether a second reachable virtual channel for forwarding the cross-ring service through the second interconnected node exists. Then, the processing module is further configured to: if the second reachable virtual channel exists, use the second reachable virtual channel to forward the cross-ring service; and if the second reachable virtual channel does not exist, discard the cross-ring service. Preferably, the processing module is specifically configured to: if the second reachable virtual channel exists, use the second reachable virtual channel to forward the cross-ring service to the second interconnected node, pop up the label of the original ring of the cross-ring service, swap the service label of the cross-ring service of which the label of the original ring is popped up, push the label of the interconnected ring in the cross-ring service, and enable the cross-ring service in which the label of the interconnected ring is pushed to enter the interconnected ring at the second interconnected node.

The reachability determining information includes a topology of the interconnected ring, fault information of the interconnected ring and an identification ID of an off-ring node of the cross-ring service.

For a working principle of the device according to the embodiment of the present invention, reference may be made to the descriptions in the foregoing method embodiments.

It can be seen from the foregoing description that, the to-be-processed services are pre-classified as the single ring service for the original ring and the cross-ring service for the interconnected ring, the virtual channel is used to process the cross-ring service, and the actual channel is used to process the single ring service, so that an interconnected node of the original ring and the interconnected ring does not need to be configured with processing information of the single ring service, which reduces calculation amount at the interconnected node, lowers a network resource overhead, and improves processing efficiency of the interconnected ring of the cross-ring service. Therefore, by using the device in the embodiment of the present invention, the network resource overhead is effectively lowered, and the processing efficiency of the interconnected ring of the cross-ring service is improved.

Figure 12:
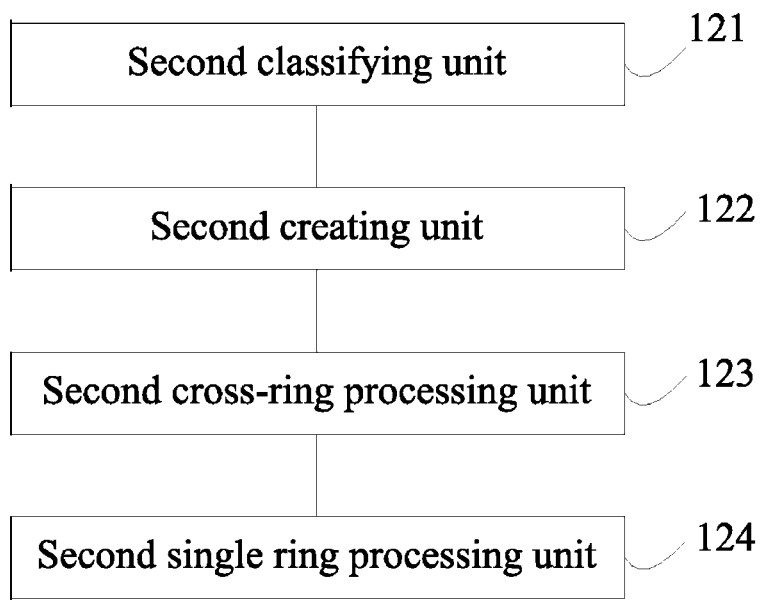
FIG. 12 is a schematic diagram of a device for processing an interconnected ring in multi-protocol label switching according to Embodiment 6 of the present invention.

As shown in FIG. 12, Embodiment 6 of the present invention provides a device for processing an interconnected ring in multi-protocol label switching, which includes: a second classifying unit 121, configured to classify to-be-processed connectivity checks as a single ring connectivity check for an original ring and a cross-ring connectivity check for an interconnected ring corresponding to the original ring; a second creating unit 122, configured to determine information about a virtual point corresponding to the interconnected ring, and create a virtual channel of the original ring according to the information about the virtual point; a second cross-ring processing unit 123, configured to use the virtual channel created by the second creating unit 122 to forward the cross-ring connectivity check to the interconnected ring, where the cross-ring connectivity check is obtained through classification of the second classifying unit 121; and a second single ring processing unit 124, configured to process the single ring connectivity check according to a pre-created actual channel of the original ring, where the single ring connectivity check is obtained through classification of the second classifying unit 121.

In the embodiment, the virtual channel includes an RCW channel, a RAP channel, a RAW channel and an RCP channel. The information about the virtual point includes: an identification ID of the virtual point, an identification ID of the original ring, an identification ID of the interconnected ring, an identification ID of a first interconnected node and an identification ID of a second interconnected node.

The to-be-processed connectivity check is specifically a to-be-processed connectivity check performed by a starting node for a destination node, where the starting node is located on the original ring. In this case, the second classifying unit 121 is specifically configured to: when an identification ID of a ring on which the destination node is located is consistent with the identification ID of the original ring, determine that the destination node is located on the original ring, and determine the connectivity check performed by the starting node for the destination node as the single ring connectivity check for the original ring; and when the identification ID of the ring on which the destination node is located is consistent with the identification ID of the interconnected ring, determine that the destination node is located on the interconnected ring, and determine the connectivity check performed by the starting node for the destination node as the cross-ring connectivity check for the interconnected ring.

In the embodiment, the cross-ring connectivity check includes a cross-ring connectivity check request message sent by the starting node to the destination node, and the device further includes a forwarding unit, configured to use a pre-created actual channel of the interconnected ring to forward the cross-ring connectivity check request message to the destination node; and after the destination node receives the cross-ring connectivity check request message, use a reverse channel having a same path as the pre-created actual channel of the interconnected ring to forward, to the original ring, a cross-ring connectivity check response message sent by the destination node to the starting node, and use a reverse channel having a same path as the virtual channel to forward the cross-ring connectivity check response message to the starting node.

Preferably, the second cross-ring processing unit may include a determining module and a forwarding module. The determining module is configured to determine, according to connection determining information, whether a first connection virtual channel for forwarding the cross-ring connectivity check through the first interconnected node exists. The forwarding module is configured to: if the first connection virtual channel exists, use the first connection virtual channel to forward the cross-ring connectivity check; and if the first connection virtual channel does not exist, send the cross-ring connectivity check from the first interconnected node to the second interconnected node. The determining module is further configured to determine, according to the connection determining information, whether a second connection virtual channel for forwarding the cross-ring connectivity check through the second interconnected node exists. The forwarding module is further configured to: if the second connection virtual channel exists, use the second connection virtual channel to forward the cross-ring connectivity check; and if the second connection virtual channel does not exist, discard the cross-ring connectivity check. The connection determining information includes a topology of the interconnected ring, fault information of the interconnected ring and an identification ID of the destination node.

Preferably, the single ring connectivity check includes a single ring connectivity check request message sent by the starting node to the destination node, the second single ring processing unit is specifically configured to use the actual channel of the original ring to forward the single ring connectivity check request message that is sent by the starting node to the destination node; and after the destination node receives the single ring connectivity check request message, use a reverse channel having a same path as the actual channel of the original ring to forward a single ring connectivity check response message that is sent by the destination node to the starting node.

For a working principle of the device according to the embodiment of the present invention, reference may be made to the descriptions in the foregoing method embodiments.

It can be seen from the foregoing description that, the to-be-processed connectivity checks are pre-classified as the single ring connectivity check for the original ring and the cross-ring connectivity check for the interconnected ring, the virtual channel is used to process the cross-ring connectivity check, and the actual channel is used to process the single ring connectivity check, so that a state of a connection between any two nodes on the original ring and the interconnected ring can be detected at any time when no service is processed, flexibility of detecting a state of a connection between any two nodes on the original ring and the interconnected ring is improved, and an interconnected node between the original ring and the interconnected ring does not need to be configured with processing information of the single ring connectivity check, which reduces calculation amount at the interconnected node, and lowers a network resource overhead. Therefore, by using the technical solution in the embodiment of the present invention, the flexibility of detecting a state of a connection between any two nodes on the original ring and the interconnected ring is improved, and the network resource overhead is effectively lowered.

In conclusion, by using the technical solutions in the embodiment of the present invention, a network resource overhead is effectively lowered, and processing efficiency of an interconnected ring of a cross-ring service is improved.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the claims.

What is claimed is:

1. A method for processing an interconnected ring in multi-protocol label switching, the method comprising:
classifying, at a first on-ring node, a first to-be-processed service as a single ring service for an original ring, wherein the first on-ring node and a first off-ring node of the first to-be-processed service are located on the original ring;
classifying, at a second on-ring node, a second to-be-processed service as a cross-ring service for an interconnected ring corresponding to the original ring, wherein the second on-ring node of the second to-be-processed service is located on the original ring and a second off-ring node of the second to-be-processed service is not located on the original ring, wherein the interconnected ring is a different ring than the original ring, wherein the interconnected ring and the original ring have a first interconnected node and a second interconnected node that are each comprised in both the original ring and the interconnected ring, wherein the second off-ring node of the second to-be-processed service is not accessible by a ring that is connected to the second on-ring node, and wherein the interconnected ring is not directly connected to the second on-ring node;
determining information about a virtual point corresponding to the interconnected ring in response to classifying the second to-be-processed service as a cross-ring service for the interconnected ring;
creating a virtual channel of the original ring according to the information about the virtual point;
determining, according to reachability determining information, whether a first reachable virtual channel for forwarding the cross-ring service from the second on-ring node through the first interconnected node to the second off-ring node exists, wherein the reachability determining information comprises topology information and fault information of the interconnected ring;
in response to the first reachable virtual channel existing:
using the first reachable virtual channel to forward the cross-ring service to the first interconnected node;
leaving the original ring by the cross-ring service;
entering the interconnected ring by the cross-ring service;
forwarding the cross ring service from the first interconnected node to the second off-ring node; and
processing the single ring service according to a pre-created actual channel of the original ring.

2. The method according to claim 1, wherein classifying the first to-be-processed service and the second to-be-processed service comprises classifying, at the first on-ring node or the second on-ring node, the first to-be-processed service as the single ring service for the original ring and the second to-be-processed service as the cross-ring service for the interconnected ring according to service labels of the first to-be-processed service and the second to-be-processed service.

3. The method according to claim 1, wherein the information about the virtual point comprises an identification ID of the virtual point, an identification ID of the original ring, an identification ID of the interconnected ring, an identification ID of a first interconnected node and an identification ID of a second interconnected node.

4. The method according to claim 3, further comprising:
in response to the first reachable virtual channel not existing, sending the cross-ring service from the first interconnected node to the second interconnected node, and determining, according to the reachability determining information, whether a second reachable virtual channel for forwarding the cross-ring service through the second interconnected node exists;
if the first reachable virtual channel does not exist and the second reachable virtual channel exists, using the second reachable virtual channel to forward the cross-ring service; and if the first reachable virtual channel does not exist and the second reachable virtual channel does not exist, discarding the cross-ring service;

wherein the reachability determining information further comprises an identification ID of an off-ring node of the cross-ring service.

5. The method according to claim 4, wherein leaving the original ring by the cross-ring service and entering the interconnected ring by the cross-ring service comprises popping up a label of the original ring of the cross-ring service, swapping a service label of the cross-ring service of which the label of the original ring is popped up, pushing a label of the interconnected ring in the cross-ring service, and enabling the cross-ring service in which the label of the interconnected ring is pushed to enter the interconnected ring at the first interconnected node; and wherein the using the second reachable virtual channel to forward the cross-ring service comprises using the second reachable virtual channel to forward the cross-ring service to the second interconnected node, popping up a label of the original ring of the cross-ring service, swapping a service label of the cross-ring service of which the label of the original ring is popped up, pushing a label of the interconnected ring in the cross-ring service, and enabling the cross-ring service in which the label of the interconnected ring is pushed to enter the interconnected ring at the second interconnected node.

6. A method for processing an interconnected ring in multi-protocol label switching, the method comprising:

classifying, at a first starting node, a first to-be-processed connectivity check as a single ring connectivity check for an original ring, wherein the first starting node and a first destination node of the first to-be-processed connectivity check are on the original ring;

classifying, at a second starting node, a second to-be-processed connectivity check as a cross-ring connectivity check for an interconnected ring corresponding to the original ring, wherein a second starting node of the second to-be-processed connectivity check is on the original ring and a second destination node is not on the original ring, wherein the second destination node of the second to-be-processed connectivity check is not accessible by a ring that is connected to the second starting node, and wherein the interconnected ring is not directly connected to the second starting node;

determining information about a virtual point corresponding to the interconnected ring;

creating a virtual channel of the original ring according to the information about the virtual point in response to classifying a second to-be-processed connectivity check as a cross-ring connectivity check for an interconnected ring;

receiving, by the original ring, connection determining information regarding the interconnected ring, wherein the connection determining information comprises topology information and fault information of the interconnected ring;

determining, according to the connection determining information, whether a first connection virtual channel for forwarding the cross-ring connectivity check from the second starting node through an interconnected node to the second destination node exists;

in response to the first connection virtual channel existing, using the virtual channel to forward the cross-ring connectivity check to the interconnected ring, and leaving the original ring by the cross-ring connectivity check, wherein the cross-ring connectivity check does not leave the original ring if the first connection virtual channel does not exist; and processing the single ring connectivity check according to a pre-created actual channel of the original ring.

7. The method according to claim 6, wherein classifying the, first to-be-processed connectivity check and the second to-be-processed connectivity check comprises:

when an identification ID of a ring on which the first destination node is located is consistent with an identification ID of the original ring, determining that the first destination node is located on the original ring, and determining the connectivity check performed by the first starting node for the first destination node as the single ring connectivity check for the original ring; and when the identification ID of the ring on which the second destination node is located is consistent with an identification ID of the interconnected ring, determining that the second destination node is located on the interconnected ring, and determining the connectivity check performed by the second starting node for the second destination node as the cross-ring connectivity check for the interconnected ring.

8. The method according to claim 7, wherein the information about the virtual point comprises an identification ID of the virtual point, the identification ID of the original ring, the identification ID of the interconnected ring, an identification ID of a first interconnected node and an identification ID of a second interconnected node.

9. The method according to claim 8, wherein the cross-ring connectivity check comprises a cross-ring connectivity check request message sent by the second starting node to the second destination node, and after the using the virtual channel to forward the cross-ring connectivity check to the interconnected ring, the method further comprises:

using a pre-created actual channel of the interconnected ring to forward the cross-ring connectivity check request message to the second destination node; and after the second destination node receives the cross-ring connectivity check request message, using a reverse channel having a same path as the pre-created actual channel of the interconnected ring to forward, to the original ring, a cross-ring connectivity check response message sent by the second destination node to the second starting node, and using a reverse channel having a same path as the virtual channel to forward the cross-ring connectivity check response message to the second starting node.

10. The method according to claim 7, wherein the single ring connectivity check comprises a single ring connectivity check request message sent by the first starting node to the first destination node, and wherein processing the single ring connectivity check according to a pre-created actual channel of the original ring comprises:

using the actual channel of the original ring to forward the single ring connectivity check request message; and after the first destination node receives the single ring connectivity check request message, using a reverse channel having a same path as the actual channel of the original ring to forward a single ring connectivity check response message that is sent by the first destination node to the first starting node.

11. The method according to claim 6, further comprising:

if the first connection virtual channel does not exist, sending the cross-ring connectivity check from a first interconnected node to a second interconnected node, and determining, according to the connection determining information, whether a second connection virtual channel for forwarding the cross-ring connectivity check through the second interconnected node exists;

if the first connection virtual channel does not exist and the second connection virtual channel exists, using the second connection virtual channel to forward the cross-ring connectivity check; and if the first connection virtual channel does not exist and the second connection virtual channel does not exist, discarding the cross-ring connectivity check;

wherein the connection determining information further comprises an identification ID of a destination node.

12. A device for processing an interconnected ring in multi-protocol label switching, comprising:
a processor; and
a computer-readable storage medium storing a program to be executed by the processor, the program including instructions for:
classifying a first to-be-processed service as a single ring service for an original ring, wherein a first off ring node of the first to-be-processed service is located on the original ring; and
classifying a second to-be-processed service as a cross-ring service for an interconnected ring corresponding to the original ring, wherein a second off ring node of the second to-be-processed service is not located on the original ring;
determining information about a virtual point corresponding to the interconnected ring, and creating a virtual channel of the original ring according to the information about the virtual point in response to classifying the second to-be-processed service as a cross-ring service for an interconnected ring;
using the virtual channel to forward the cross-ring service to the interconnected ring; and
processing the single ring service according to a pre-created actual channel of the original ring;
wherein faults of the interconnected ring are detected by nodes of the original ring, wherein a first interconnected node and a second interconnected node are each comprised within each of the original ring and the interconnected ring, and the cross-ring service is forwarded by the device only if there exists a pre-created actual channel of the interconnected ring available to forward the cross ring service to the second off ring node from the first interconnected node or from the second interconnected node, wherein the second off ring node of the second to-be-processed service is not accessible by a ring that is connected to the device, and wherein the interconnected ring is not directly connected to the device.

13. The device according to claim 12, wherein the program further includes instructions for classifying, at an on-ring node, the first to-be-processed service as the single ring service for the original ring and the second to-be-processed service as the cross-ring service for the interconnected ring according to service labels of the first to-be-processed service and the second to-be-processed service.

14. The device according to claim 13, wherein the information about the virtual point comprises an identification ID of the virtual point, an identification ID of the original ring, an identification ID of the interconnected ring, an identification ID of the first interconnected node and an identification ID of the second interconnected node.

15. The device according to claim 14, wherein the program further includes instructions for:

determining, according to reachable determining information, whether a first reachable virtual channel for forwarding the cross-ring service through the first interconnected node exists;

if the first reachable virtual channel exists, using the first reachable virtual channel to forward the cross-ring service and, if the first reachable virtual channel does not exist, sending the cross-ring service from the first interconnected node to the second interconnected node;

determining, according to the reachable determining information, whether a second reachable virtual channel for forwarding the cross-ring service through the second interconnected node exists; and if the first reachable virtual channel does not exist and the second reachable virtual channel exists, using the second reachable virtual channel to forward the cross-ring service and, if the first reachable virtual channel does not exist and the second reachable virtual channel does not exist, discarding the cross-ring service;

wherein the reachable determining information comprises a topology of the interconnected ring, fault information of the interconnected ring and an identification ID of an off-ring node of the cross-ring service.

16. The device according to claim 15, wherein the program further includes instructions for, if the first reachable virtual channel exists, using the first reachable virtual channel to forward the cross-ring service to the first interconnected node, popping up a label of the original ring of the cross-ring service, swapping a service label of the cross-ring service of which the label of the original ring is popped up, pushing a label of the interconnected ring in the cross-ring service, and enabling the cross-ring service in which the label of the interconnected ring is pushed to enter the interconnected ring at the first interconnected node; or wherein the program further includes instructions for, if the second reachable virtual channel exists, using the second reachable virtual channel to forward the cross-ring service to the second interconnected node, popping up a label of the original ring of the cross-ring service, swapping a service label of the cross-ring service of which the label of the original ring is popped up, pushing in a label of the interconnected ring in the cross-ring service, and enabling the cross-ring service in which the label of the interconnected ring is pushed to enter the interconnected ring at the second interconnected node.

17. A device for processing an interconnected ring in multi-protocol label switching, the device comprising:
a processor;
a computer-readable storage medium storing a program to be executed by the processor, the program including instructions for:
classifying a first to-be-processed connectivity check as a single ring connectivity check for an original ring, wherein a first starting node and a first destination node of the first to-be-processed connectivity check are on the original ring;
classifying a second to-be-processed connectivity check as a cross-ring connectivity check for an interconnected ring corresponding to the original ring, wherein a second starting node of the second to-be-processed connectivity check is on the original ring and a second destination node is not on the original ring;
determining information about a virtual point corresponding to the interconnected ring, and creating a virtual channel of the original ring according to the information about the virtual point in response to classifying the second to-be-processed connectivity check as a cross-ring connectivity check for an interconnected ring;

using the virtual channel to forward the cross-ring connectivity check to the interconnected ring, so that the cross-ring connectivity check enters the interconnected ring and is forwarded to the second destination node using a pre-created actual channel of the interconnected ring; and processing the single ring connectivity check according to a pre-created actual channel of the original ring; and a receiver, configured to receive a cross-ring connectivity check response message sent by the second destination node to the second starting node after the second destination node receives the cross-ring connectivity check, the cross-ring connectivity check response message being sent using a reverse channel having a same path as the pre-created actual channel of the interconnected ring to forward the cross-ring connectivity check response message to the original ring, and using a reverse channel having a same path as the virtual channel to forward the cross-ring connectivity check response message to the second starting node;

wherein the second destination node is not accessible by a ring that is connected to the second starting node, and wherein the interconnected ring is not directly connected to the second starting node.

18. The device according to claim 17, wherein the program further includes instructions for:

when an identification ID of a ring on which the first destination node is located is consistent with an identification ID of the original ring, determining that the first destination node is located on the original ring, and determining the connectivity check performed by the first starting node for the first destination node as the single ring connectivity check for the original ring; and when the identification ID of the ring on which the second destination node is located is consistent with an identification ID of the interconnected ring, determining that the second destination node is located on the interconnected ring, and determining the connectivity check performed by the second starting node for the second destination node as the cross-ring connectivity check for the interconnected ring.

19. The device according to claim 18, wherein the information about the virtual point comprises an identification ID of the virtual point, the identification ID of the original ring, the identification ID of the interconnected ring, an identification ID of a first interconnected node and an identification ID of a second interconnected node.

20. The device according to claim 17, wherein the program further includes instructions for:

determining, according to connection determining information, whether a first connection virtual channel for forwarding the cross-ring connectivity check through a first interconnected node exists;

if the first connection virtual channel exists, using the first connection virtual channel to forward the cross-ring connectivity check, and if the first connection virtual channel does not exist, sending the cross-ring connectivity check from the first interconnected node to a second interconnected node;

determining, according to the connection determining information, whether a second connection virtual channel for forwarding the cross-ring connectivity check through the second interconnected node exists; and if the first connection virtual channel does not exist and the second connection virtual channel exists, using the second connection virtual channel to forward the cross-ring connectivity check, and if the first connection virtual channel does not exist and the second connection virtual channel does not exist, discarding the cross-ring connectivity check;

wherein the connection determining information comprises a topology of the interconnected ring, fault information of the interconnected ring and an identification ID of a destination node.

21. The method according to claim 1, wherein the first on-ring node and the second on-ring node are a same node.

22. The method according to claim 1, wherein the first on-ring node and the second on-ring node are different nodes.

* * * * *